Sept. 12, 1961 W. H. REICHLEIN 2,999,314
COOKY, BISCUIT AND DOUGHNUT CUTTER
Filed May 24, 1960
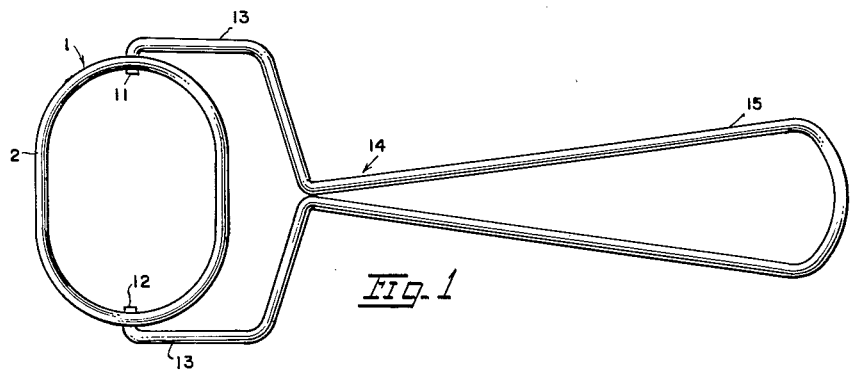
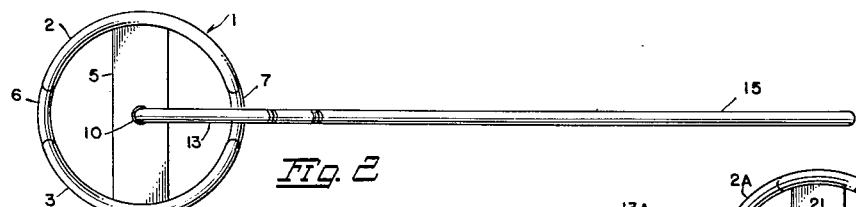
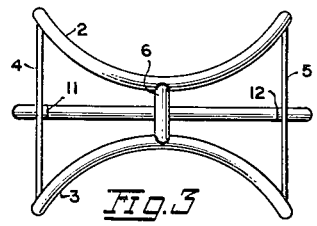
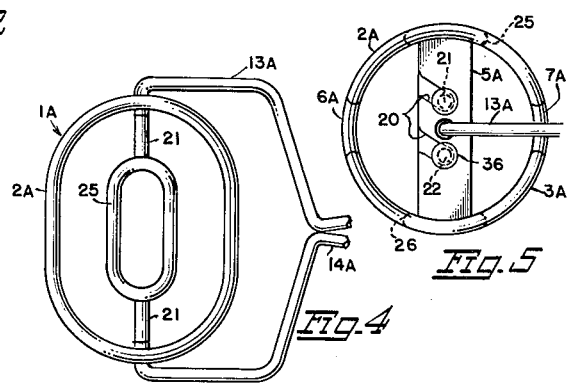
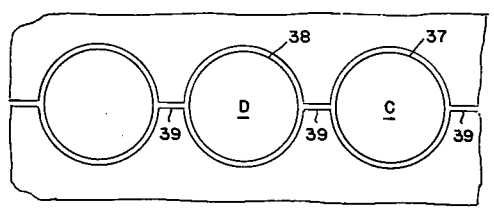
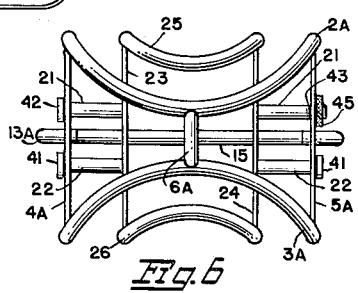
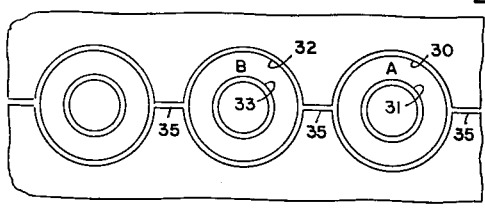
WILLIAM H. REICHLEIN
INVENTOR.
BY James D. Girnan
ATT'Y

United States Patent Office 2,999,314
Patented Sept. 12, 1961

2,999,314
COOKY, BISCUIT AND DOUGHNUT CUTTER
William H. Reichlein, 8642 SE. Holgate Blvd.,
Portland 66, Oreg.
Filed May 24, 1960, Ser. No. 31,297
1 Claim. (Cl. 30—306)

This invention relates to improvements in devices for cutting cookies, biscuits, doughnuts and the like. It is one of the principal objects of the present invention to provide a simple, revolving cutter which is adapted for cutting the dough of cookies, biscuits and the like into circular form or doughnuts or cookies into ring form.

A further object of the invention is to provide a rotary cutter of the character described which may be rapidly pushed over a sheet of cooky dough and the like to cut a plurality of cookies in a straight line in one operation, and wherein upon completion of the operation, the dough on one side of the line is separated from that on the other to facilitate gathering the residual dough and rolling it out into a successive sheet.

A further object of the invention is to provide a rotary cooky cutter in which the cutting edges will come into shearing contact with the material to be cut.

A further object is the provision of a cutter for cookies, biscuits, doughnuts and the like, which is of simple, efficient, durable and inexpensive construction and is well-adapted for the purposes intended.

The foregoing and other objects and advantages which will become subsequently apparent reside in the details of construction and operation as more fully hereinafter described and claimed, reference being had to the accompanying drawing forming a part hereof and in which:

FIGURE 1 is a top plan view of a form of embodiment of my device that may be used only for the production of cookies and biscuits.

FIGURE 2 is a side elevational view of FIGURE 1.

FIGURE 3 is a front elevational view of FIGURE 1.

FIGURE 4 is a fragmentary view similar to FIGURE 1 showing a modified form of embodiment of the invention including an attachment that may be used only for the production of doughnuts or cooky rings if desired.

FIGURES 5 and 6 are, respectively, side and front elevational views of FIGURE 4.

FIGURE 7 illustrates diagrammatically and on a reduced scale the manner in which dough in sheet form, and cut in a straight line by the cutter, forms individual cookies or biscuits and at the same time divides the dough on both sides of the line, and FIGURE 8 is a view similar to FIGURE 7 showing the manner in which the dough is similarly cut and divided in the production of doughnuts or ring cookies.

With continuing reference to the drawing wherein like references of character designate like parts, reference numeral 1 indicates generally a cutting head for the production of cookies, and which comprises two identical cutting elements 2 and 3 each of substantially elliptical shape in plan view, semi-circular in end view, and arcuate in front view, as shown respectively in FIGURES 1, 2 and 3. These elements are interconnected by end plates 4 and 5 and also interconnected as at 6 and 7 with sections of wire of the same diameter as that from which the cutting elements 2 and 3 are made, so as to provide a smooth peripheral cutting rim, as shown in FIGURE 2.

The side plates have aligned openings 10 therein for rotatable attachment to trunnions 11 and 12 at the inner end of a bail member 13 constituting a part of a wire frame, indicated generally at 14, which includes a portion 15 for a hand grip.

In the modified form of the invention, for use only in the production of doughnuts or cooky rings, the cutting elements 2A—3A, interconnecting pieces 6A—7A, bifurcated frame 13A—14A and handle are identical with those shown in the first form of the invention.

The side plates 4A and 5A are each provided with two inclined slots 20 adapted to receive the outer ends of stub shafts 21 and 22 whose inner ends are secured to side plates 23—24. The ends of these plates are secured to cutting elements 25—26 which are arranged concentrically within the rings 2A and 3A and cooperate therewith in cutting the doughnut dough, as shown in FIGURE 8, wherein the outer and inner peripheries 30 and 31 of doughnut "A" have been cut, respectively, by the elements 3A and 26, and peripheries 32—33 in doughnut "B" by elements 2A and 25 and so on. The dough between the progressively formed doughnuts is cut, as at 35, by the pieces 6A—7A as they roll along and thus divide the dough along both sides of the doughnut production line. Similarly the peripheries 37 and 38 of cookies "C" and "D" in FIGURE 7 are cut by the cutting elements 2 and 3 of the cutter head of FIGURE 1 and the dough between, as at 39, by the pieces 6 and 7.

The outer ends of the stub shafts 22 are provided with heads 41. The outer end of one of the stub shafts 21 is also provided with a head 42 and the outer end of the other is threaded as at 43 and provided with a knurled nut 45. By this arrangement the doughnut cutter may be conveniently attached to the cutter head by merely dropping the stub shafts 21—22 into their respective slots 20 in the side plates 5A and locked in place by advancing the nuts on the threaded end of the stub shaft 21.

While I have shown and described a particular form of embodiment of my invention, I am aware that many minor changes therein will readily suggest themselves to others skilled in the art without departing from the spirit and scope of the invention. Having thus described my invention what I claim as new and desire to protect by Letters Patent is:

A cooky and doughnut or biscuit cutter comprising one pair of interconnected cutting elements of substantially elliptical shape in plan view, arcuate in front elevation with their convex surfaces adjacent each other and thereat interconnected by arcuate crosspieces, said cutting elements and arcuate crosspieces all made of material of uniform cross-sectional diameter whereby to present a smooth, uninterrupted circular form in side elevation, a first pair of side plates interconnecting said cutting elements and having aligned openings therethrough, said side plates having slots therein open at one of their ends, a second pair of side plates coextensive in length with said first pair of side plates, means carried by said second pair of side plates extending through said slots thereby removably mounting said second pair of side plates to said first pair of side plates, a second pair of cutting elements secured to said second pair of side plates spaced inwardly from said first pair of cutting elements concentrically therewith, and a wire frame formed into a handle at one of its ends bifurcated at its opposite end into a bail member provided with opposing trunnions journalled in said first pair of side plates, whereby when both pairs of cutting elements are rolled over a sheet of dough uninterrupted rings of dough will be cut between said first and second pairs of cutting elements and the dough between successive rings will be severed by said arcuate crosspieces, and whereby upon removal of said second pair of cutting elements and their side plates from said first pair of side plates circles of dough will be cut by said first pair of cutting elements and the dough therebetween severed by said arcuate crosspieces.

References Cited in the file of this patent

UNITED STATES PATENTS

| | | |
|---|---|---|
| 501,903 | Stone | July 18, 1893 |
| 717,537 | Brown | Jan. 6, 1903 |
| 1,778,969 | Brummett | Oct. 21, 1930 |
| 1,855,663 | Bregman | Apr. 26, 1932 |